Oct. 6, 1964    R. M. SHARP ETAL    3,152,065
FEED INJECTOR FOR CRACKING OF PETROLEUM
Filed Sept. 14, 1961

INVENTORS
ROBERT M. SHARP,
GERALD R. BOOKMYER,
BY
ATTORNEY.

United States Patent Office 3,152,065
Patented Oct. 6, 1964

3,152,065
FEED INJECTOR FOR CRACKING OF PETROLEUM
Robert M. Sharp and Gerald R. Bookmyer, Baytown, Tex., assignors, by mesne assignments, to Esso Research and Engineering Company, Elizabeth, N.J., a corporation of Delaware
Filed Sept. 14, 1961, Ser. No. 138,180
7 Claims. (Cl. 298—157)

The present invention relates to the catalytic conversion of hydrocarbons in the vapor phase with a fluidized catalyst. More particularly, the present application deals with the catalytic cracking of a hydrocarbon stream injected into the catalytic cracking zone in the liquid phase. In its most specific aspects, the present invention deals with a particular manner of injecting the hydrocarbon feed into a catalytic conversion zone whereby deleterious coking, carbon formation and product loss are minimized.

The catalytic cracking reaction wherein the present invention finds particular applicability comprises contacting a hydrocarbon stream boiling within the range of 500° F. to about 1200° F. with a cracking catalyst (e.g., silica-alumina, etc.) at a temperature within the range of about 890° F. to about 1150° F. Reactor severities of from 1 to 100 pounds of feed per hour per pound of catalyst held-up in the reactor, and oil contact times of 0.5 second to 10 minutes are normally used. Catalyst is normally circulated through the reactor at the rate of 5 to 30 pounds of catalyst per pound of oil feed. Low pressures, about atmospheric, are preferred, e.g., about 15 to 25 p.s.i.g. The reaction may be carried out in a so-called "transfer line reactor" or in a fluidized bed reactor; the present invention finds utility in either case.

Heretofore in the catalytic cracking of petroleum feed stocks, it has been known to preheat the hydrocarbon stream before injection and to supply sufficient heat to the hydrocarbon feed stock to vaporize the hydrocarbon and inject it into the reaction zone as a vapor. Alternatively, liquid hydrocarbons have been introduced as a solid stream. In this latter case, poor catalyst-oil mixing is obtained, and excessive coking and attendant product loss have been suffered. However, by the practice of the present invention, it has been found that the hydrocarbon may be charged into the reaction zone as a liquid at a temperature from 10° F. to 700° F. less than its boiling point at the pressure within the reaction zone in finely divided and fully dispersed form, with the particle size of the vapor droplets being sufficiently uniform to prevent the deleterious effects of coking and product loss hitherto experienced in the injection of a liquid feed in mass into the reaction zone.

The present invention may be more fully understood by reference to the drawings, wherein.

Figure 1:
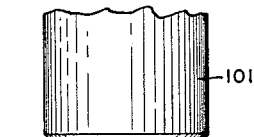
FIG. 1 is a schematic illustration of one embodiment wherein the injection means of the present invention may be employed.

Referring now to FIG. 1, the particular environment wherein the present invention finds its greatest utility and preferred mode is in a catalytic cracking unit generally referred to as 100 in FIG. 1, and further comprising a reactor 101 and a catalyst standpipe 102, which is understood to lead from a catalyst regenerator (not shown). The line 103 is provided to transfer the catalyst into the reactor 101 in admixture with the hydrocarbon feed to be introduced as hereinafter discussed. A liquid hydrocarbon feed, for example a virgin gas oil boiling within the range of 650° F. to 1200° F., is introduced by way of line 104 and is heated by heater 106, if desired, to a temperature somewhat below the boiling point at the pressure employed. It is to be understood that recycle streams may also be charged in conjunction with the virgin feed. The liquid hydrocarbon effluent from the heater 106 is then passed into the nozzle assembly generally referred to as 108 and is passed into the charge line 103 wherein it becomes mixed with hot cracking catalyst (e.g., silica-alumina) settling from the regenerator (not shown) through standpipe 102. Steam for use in the injection nozzle, as is hereinafter more fully described, is introduced by way of line 110.

Figure 3:
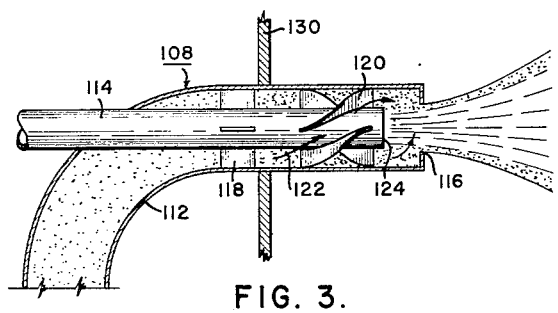
FIG. 3 is a representation of the flow of the liquid and of the dispersing stream used in the practice of the present invention.

The nozzle assembly 108 is shown in more detail in FIG. 3 wherein the hydrocarbon feed is passed by way of outer shell member 112 and through the annulus formed by the coaxially mounted tube 114 to be discharged through the orifice 116. Concurrently with the passage of the liquid hydrocarbon through the annulus, it is conducted past tube supports 118 and into contact with the helical or propeller-like assembly 120 which imparts a corkscrew or spiral motion to the liquid as indicated by the arrows 122. The tube supports 118 preferably are in the form of straightening vanes spaced at least five diameters $D_i$ from the end plate containing the orifice to counteract the turbulence experienced at the elbow. This spiral motion imparts a relatively high tangential velocity to the stream which is expended upon discharge through the orifice 116 in overcoming the surface tension of the droplets formed and helping both to break the liquid into smaller particles and to form the generally cone-shaped dispersal of the liquid after discharge from the nozzle. A stream of high pressure steam (80 to 450 p.s.i.g., preferably 80 to 150 p.s.i.g.) is passed through the line 114 and is discharged from the end 124 of the pipe 114, passing through the orifice 116 which is preferably only slightly larger in diameter than the internal diameter of pipe 114. The passage of the vapor stream through the nozzle 116 causes the liquid hydrocarbon stream to pass through the orifice in the form of an annular wall of liquid material. The amount of steam introduced through line 114 is adjusted to produce the desired distribution of hydrocarbon droplets. Generally, between .01 and 0.1 pound of steam per barrel of hydrocarbon feed will give suitable results.

The expansion of the steam as it passes through the restriction orifice 116 aids in the breaking up of the liquid which is passing from this nozzle and further reduces the particle size of the liquid discharged from the nozzle and also aids in dispersing the liquid in a hollow cone having its genesis at the free end of the nozzle. The partition means 130, shown in FIG. 3, represents the end wall of the charge line 103 as represented in FIG. 1.

It is to be understood that the charge or feed line 103 may be a transfer line reactor wherein substantially all of the cracking reaction takes place, or it may be a feed line into a dense bed reactor whereby only a portion of the reaction will take place in the feed line 103.

Figure 2:
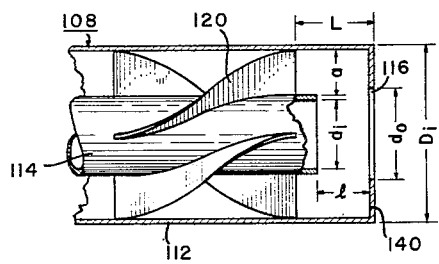
FIG. 2 is a detailed drawing showing the various interrelated dimensions of the present nozzle.

Turning now to FIG. 2, a more specific drawing showing the details of the discharge end of the nozzle 108 is set forth, showing the various dimensions which have a functional relationship in the particular nozzle under discussion. The outside shell 112 is bounded by an end plate 140 which contains an orifice 116 as set out above. The steam line 114, coaxially mounted within the shell 112 and bearing the helical vane members 120, terminates at a distance $l$ from the face of the end plate 140, and is of a diameter $d_i$ such that steam velocities ranging from 5 to 100 ft./sec. are achieved through 114 at the aforementioned steam-hydrocarbon ratios. This diameter will be roughly one-fourth the inside diameter of the outer shell 112, $D_i$. This relationship between inside diameters, $d_i/D_i$, may range between 0.1 and 0.6. The area of the annulus should be sufficient to set oil velocities through the helical vane members 120, which range between 1 and 30 ft./sec.

The terminal end of the steam pipe 114 should be no more than one diameter, $D_i$, from the face of the end plate 140, or the steam will tend to disperse and will not pass through the orifice 116 in the form of a substantially discrete vapor phase. A minimum distance $l$ of ⅛ diameters $D_i$ is required in order to admit the outer liquid stream to the orifice. The vanes 120, mounted upon the steam pipe 114, should be mounted as close to the end of the pipe 114 as is practicable, and in no event should the vanes 120 be placed more than 3 diameters, $D_i$, from the face plate 140. If the vanes 120 are placed too far from the orifice plate, the normal frictional effects of passage of the liquid through the pipe will tend to straighten the fluid flowing in a helical path and will minimize, if not completely vitiate, the effects of the helical flow in producing a centrifugal energy component.

The orifice 116 is of a diameter $d_o$ sufficient to permit the passage of the steam from line 114 through the orifice in a generally separate stream in order to provide a hollow cone of liquid droplets from the nozzle. This will normally be equal to or slightly larger than the internal diameter of the steam pipe. The diameter of the orifice with relation to the diameter of the steam pipe 114 also determines the size of liquid particles which are discharged from the nozzle. That is to say that the larger the orifice diameter, $d_o$, the larger the particles of liquid in the discharge stream. The ratio $d_i/d_o$ will range from 0.25 to 5.0. As the orifice diameter is decreased, the effect of the centrifugal component in the moving liquid stream is increased but a greater pressure drop is taken across the entire nozzle. It is contemplated that during the operation of the nozzle of the present invention, a pressure drop of between 5 pounds and 50 pounds per square inch will be taken across the nozzle during the injection of the hydrocarbon feed.

Figure 4:
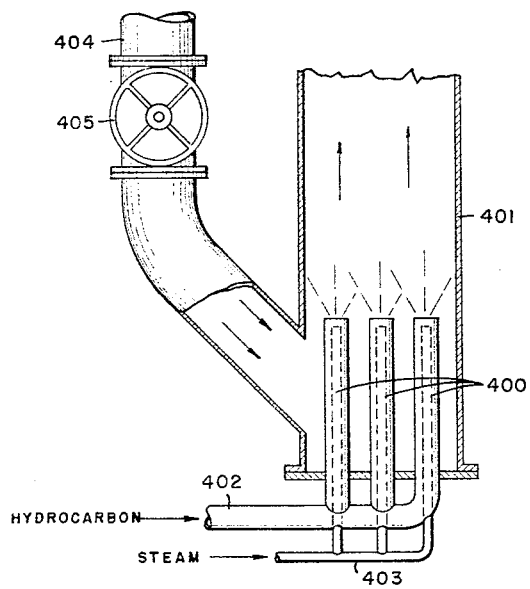
FIGS. 4 and 5 illustrate alternative installations of the nozzles of the present invention.

Referring now to FIG. 4, it is seen that a plurality of nozzles 400 constructed according to the present invention may be installed in a vertical line 401, discharging the feed stock vertically. A header 402 provides hydrocarbon to the nozzles 400, while steam or other gaseous or vaporous material is introduced by line 403. Catalyst is obtained from standpipe 404 controlled by valve 405.

Figure 5:
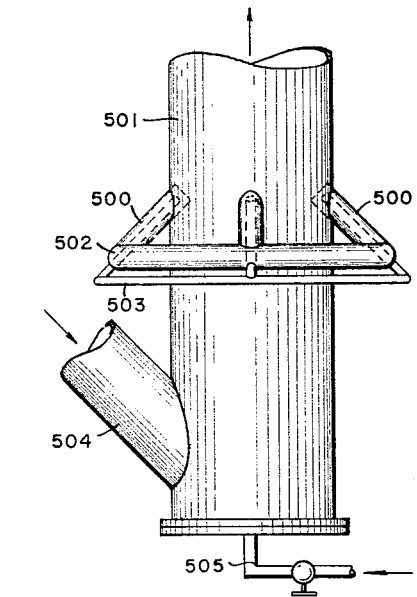

In FIG. 5 a similar installation is shown wherein the nozzles 500 discharge into the vertical line 501 at an angle to the direction of flow, and may be spaced peripherally and axially thereabout. The hydrocarbon and steam are provided by ring headers 502 and 503, respectively. Catalyst is supplied by standpipe 504 and fluidized by steam injected via line 505.

The present invention also contemplates a method of injecting a hydrocarbon feed stock into a catalytic reaction zone, which comprises passing the liquid hydrocarbon as an outer stream in a linear direction, imparting a centrifugal energy component to the stream, passing the stream with the centrifugal component through an annulus, and discharging said moving stream through a restricted passageway in contact with an inner stream of a vaporous material such as steam which operates to disperse the hydrocarbon stream into small droplets of liquid. Other vaporous or gaseous materials such as inert gases, $N_2$, natural gas, recycle catalytic cracking unit product gases, etc., and vaporized hydrocarbon feed stocks, recycle stock, etc., can be used as the inner stream. Where steam is used, it preferably is at 50 to 200 p.s.i.g. with from 0 to 100° F. of superheat. The hydrocarbon and steam after passage through the nozzle are contacted with a hot catalyst which is normally returned from the regenerator of a catalytic cracker, whereupon catalytic cracking of the hydrocarbon takes place. The amount of steam or other vaporous material introduced into the reaction zone is beneficial in aiding in the fluidization of the catalyst stream and also reducing the oil partial pressure which aids in cracking.

In summary then, it can be seen that the present inventors have provided an apparatus and method whereby the hydrocarbon feed stream to a catalytic cracker may be injected in the liquid phase while obviating the expected deleterious effects of such an injection. Although a preferred mode of practicing the present invention has been set forth, the examples given by way of explanation do not comprise the invention in its broadest scope. The invention should be limited not by the specific examples given, but rather by the appended claims.

We claim:

1. A method of injecting hydrocarbon feed stock into a catalytic conversion zone which comprises passing said hydrocarbon in the liquid phase as an outer stream in a generally linear direction, imparting a centrifugal energy component to said outer stream, passing said outer stream having a centrifugal component through a restricted opening, passing an inner stream of material in the vapor phase concentrically within said outer stream and through said opening to maintain said outer stream as an annulus of liquid material thereabout, and contacting the effluent stream from said restricted opening with a catalyst under conversion conditions.

2. A method in accordance with claim 1 wherein the material in the vapor phase is steam.

3. A method in accordance with claim 2 wherein the liquid hydrocarbon feed stock is heated before injection to a temperature from 10° F. to 700° F. less than its boiling point at the pressure within the reaction zone.

4. A method in accordance with claim 1 wherein the linear velocity of the hydrocarbon outer stream is between 1 and 30 ft./sec. and the linear velocity of the vapor phase material is between 5 and 100 ft./sec.

5. A nozzle for injecting a liquid hydrocarbon feed into contact with a catalyst under conversion conditions which comprises an outer shell having an end plate, an orifice concentric with said shell in said end plate, a longitudinally extending concentric conduit within said shell terminating not more than one diameter from said end plate, and vane means mounted exteriorly of said concentric conduit and within said outer shell and terminating not more than three diameters of said outer shell from said end plate for imparting a centrifugal energy component to material being flowed through said outer shell, said "diameters" being a distance equal to the inside diameter of said outer shell.

6. An apparatus in accordance with claim 5 wherein the ratio of the inside diameter of the inner conduit means and said outer shell is within the range of 0.1 to 0.6, and the ratio of the inner diameter of said inner conduit and the diameter of said orifice is within the range of 0.25 to 5.0.

7. An apparatus in accordance with claim 6 further comprising straightening vanes mounted on said inner conduit means spaced from said end plate at least five diameters of said outer shell.

References Cited in the file of this patent

UNITED STATES PATENTS

| | | |
|---|---|---|
| 2,786,742 | McKinley et al. | Apr. 4, 1952 |
| 2,786,801 | McKinley et al. | Mar. 26, 1957 |
| 2,952,619 | Metrailer et al. | Sept. 13, 1960 |